Nov. 17, 1925.

W. E. LANE 1,561,864

TABULATING SCALE FOR TYPEWRITING MACHINES

Filed March 18, 1925

Inventor:

William Edward Lane

Patented Nov. 17, 1925.

1,561,864

UNITED STATES PATENT OFFICE.

WILLIAM EDWARD LANE, OF ST. LOUIS, MISSOURI.

TABULATING SCALE FOR TYPEWRITING MACHINES.

Application filed March 18, 1925. Serial No. 16,541.

*To all whom it may concern:*

Be it known that I, WILLIAM EDWARD LANE, a citizen of the United States, and a resident of the city of St. Louis, State of Missouri, have invented certain new and useful Improvements in Tabulating Scales for Typewriting Machines, of which the following is a specification.

The invention relates to tabulating scales for typewriting machines, particularly for the type of such machines which uses two sets of graduated scales; that is, a single- or double-section scale next the platen and a scale on the front framework. The improved scale will be mounted in the latter position. Its purpose is to facilitate the tabulation of typewritten numerals on ruled forms and to provide means to insure the vertical alignment of numerals so tabulated.

The construction shown and described has the following advantages: First, that a main scale for ordinary work and retaining means to receive and house an auxiliary scale for tabulative work can be formed by and in a single member; second, the formation of the retaining means is of such nature as to afford great facility in inserting and removing the tabulating means; third, the construction permits of the use of a reversible and invertible scale having two sets of tabular forms on each face, and it also makes possible the use of any number of differentiated auxiliary scale members in tabulative work of varying character; fourth, it enables the arrangement of tabular matter in groups spaced apart in any desired relation, as well as insuring the vertical alignment of the units of such groups.

In the accompanying drawings—

Figure 1:
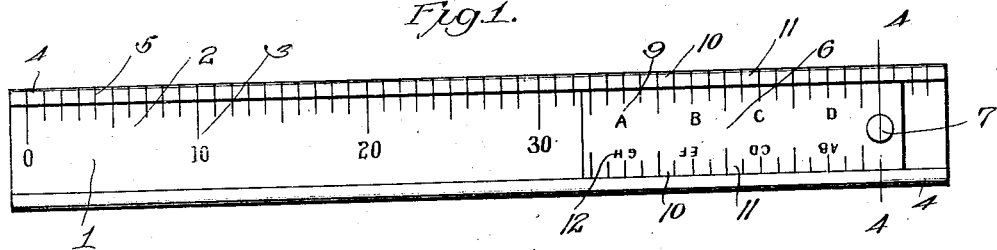
Figure 1 is an elevation of the main scale showing the obverse face of the auxiliary scale and the housing of the auxiliary scale within the flanges of the main scale.

Referring to the drawings, 1 represents a body, of sheet metal, having the scale graduations 2 and the numerals 3 usual to typewriter scales. The body 1 has formed upon its upper and lower edge the flanges 4—4, the uppermost of these flanges having the incised vertical graduation lines 5, spaced apart to align with the graduation lines 2, the purpose of the first-mentioned lines being to facilitate the reading of the main scale in ordinary use, and to insure the alignment of an auxiliary scale member, to be presently referred to.

The flanges 4—4 of the body 1 serve as retaining means to house a double-faced auxiliary scale member, the outer face of which is designated by the numeral 6 and which consists of a flat metal plate having the set screw 7 insertable through the threaded orifice 8 and bearing against the outer face of the body 1 as a means of anchoring the auxiliary scale member against horizontal displacement.

There is incised upon the upper margin of the outer face 6 of the auxiliary scale member a plurality of arbitrary symbols 9, consisting of letters, and a plurality of vertical graduation lines 10 spaced apart to align with the graduations 4 and divided into groups by the elongation of certain of their units as designated by the drawing numerals 11—11. The lower margin of the auxiliary scale face 6 has an arrangement of arbitrary symbols and graduation lines exactly similar to that shown as incised upon its upper margin, except for a differentiation of symbols, as shown by the numeral 12.

Figure 2:
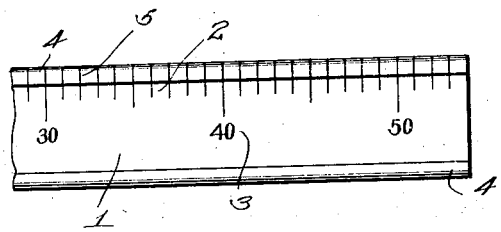
Figure 2 is an elevation of a fragment of the main scale showing the graduations and graduation numerals not shown in Figure 1.
Figure 3:
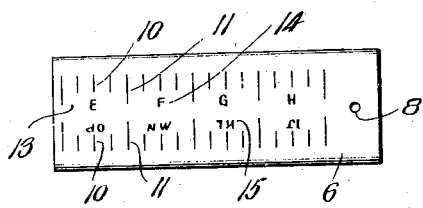
Figure 3 is an elevation of the reverse face of the auxiliary scale.
Figure 4:
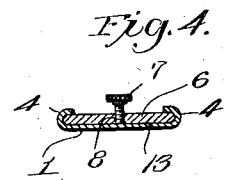
Figure 4 is a view in transverse section taken on the plane lines 4—4 of Figure 1 and showing detail of the fastening means.

The reverse face of the auxiliary scale member, indicated by the numeral 13, has upon its upper and lower margin an arrangement of short and long graduation lines (10—11) and two sets of differentiated symbols, indicated respectively by the numerals 14 and 15, as shown in Figure 2.

The purpose of the short-length graduation lines described is to facilitate the ready and accurate placing and tabulating of numerals, and the purpose of the elongation of certain of these lines is to more particularly designate the columns differentiated by the arbitrary symbols.

Referring to the latter, it is to be understood that these symbols are not an essential part of the invention in their individual characters, and that they may be varied according to the following:

In ruled forms having word-designations for each column, such words may be substituted for the one- and two-letter symbols shown and the spacing apart of the elongated graduation lines to mark the several columns be varied accordingly.

I claim:

1. In a tabulating scale for typewriting machines, a flat plate of metal bent upon itself at its upper and at its lower edge to form longitudinal flanges extending to open ends at each side portion thereof, the said plate having formed upon one face the characters common to typewriter scales; in combination with linear graduations upon the said upper flange.

2. In a tabulating scale for typewriting machines, a main scale consisting of a flat metal plate bent upon itself at its upper and at its lower edge to form longitudinal flanges and having the characters common to typewriter scales, in combination with an adjustable, auxiliary, tabulating scale element having incised or otherwise formed characters constituting aids to the tabulation of typewritten numerals.

3. In a tabulating scale for typewriting machines, a flat metal plate having incised or otherwise formed characters constituting aids to the tabulation of typewritten numerals upon the upper margin of one face thereof, and having upon its lower margin tabulating aids similar in nature to the above-described characters, the said plate being invertible as to its lower margin.

4. In a device of the character described, a flanged main scale adapted to house an auxiliary, tabulating, scale member consisting of a flat metal plate; said auxiliary scale being reversible and invertible as to both faces and having incised characters consisting of graduation lines and letter symbols upon both its outer and its inner face; said characters being arranged upon the upper margin and upon the lower margin of said outer and inner faces.

5. In a device of the character described, a flanged main scale adapted to house an auxiliary, tabulating, scale consisting of a flat metal plate; both faces of said auxiliary scale having incised vertical graduation lines arranged into groups by the elongation of certain of their units to constitute column-marking designations; and having a plurality of arbitrary symbols consisting of letters incised upon each face.

6. In a device of the character described, a conventionally characterized main scale, having a flange upon its upper and lower edge; an auxiliary, tabulating scale member consisting of a flat metal plate insertible within said flanges; incised characters upon the upper and upon the lower margin of each face of the said auxiliary scale member; said characters consisting of vertical graduation lines divided into groups by the elongation of certain of their units to constitute column-marking designations, in combination with a plurality of arbitrary symbols consisting of one or more letters incised upon the upper and lower margin of both faces of said auxiliary scale member and arranged between said column-marking designations, substantially as described in the foregoing specification.

In testimony whereof I have hereunto set my hand.

WILLIAM EDWARD LANE.